United States Patent [19]

DiBuo et al.

[11] Patent Number: 4,525,106
[45] Date of Patent: Jun. 25, 1985

[54] PNEUMATIC CONVEYING DEVICE

[75] Inventors: Louis J. DiBuo, Newringgold; Paul E. Solt, Allentown; Marvyn L. Souders, Orefield, all of Pa.

[73] Assignee: Fuller Company, Bethlehem, Pa.

[21] Appl. No.: 561,093

[22] Filed: Dec. 13, 1983

[51] Int. Cl.³ ............................................. B65G 53/48
[52] U.S. Cl. ........................................ 406/60; 406/61
[58] Field of Search ............................ 406/56, 60, 61; 198/671; 222/413

[56] References Cited

U.S. PATENT DOCUMENTS

| 3,106,428 | 10/1963 | Lenhart | 406/60 |
| 3,232,419 | 2/1966 | Rasmussen | 198/671 |
| 4,109,966 | 8/1978 | Boyhont et al. | 406/60 |

Primary Examiner—Jeffrey V. Nase
Assistant Examiner—Mary Beth O. Jones
Attorney, Agent, or Firm—Frank H. Thomson

[57] ABSTRACT

Apparatus for conveying solid particulate material which takes the form of a line charging device for a pneumatic conveying system. The apparatus is of the type which includes a screw impeller rotatable in a casing for advancing material from a hopper through the casing to a discharge chamber. From the discharge chamber, gas under pressure entrains the material and serves to convey it through an attached conveying line. A pair of diametrically opposed outlets from the casing are provided to introduce material from the casing into the discharge chamber. A normally closed flap valve is operatively associated with each of the casing outlets to aid in establishing a seal of material at the outlet. The use of nozzles between the source of gas under pressure and the conveying line has been eliminated. The inlet for the conveying air and outlet for material being conveyed are interchangeable to permit connection of the source of gas under pressure to either side of the unit and connection of the conveying conduit to either side of the unit.

17 Claims, 5 Drawing Figures

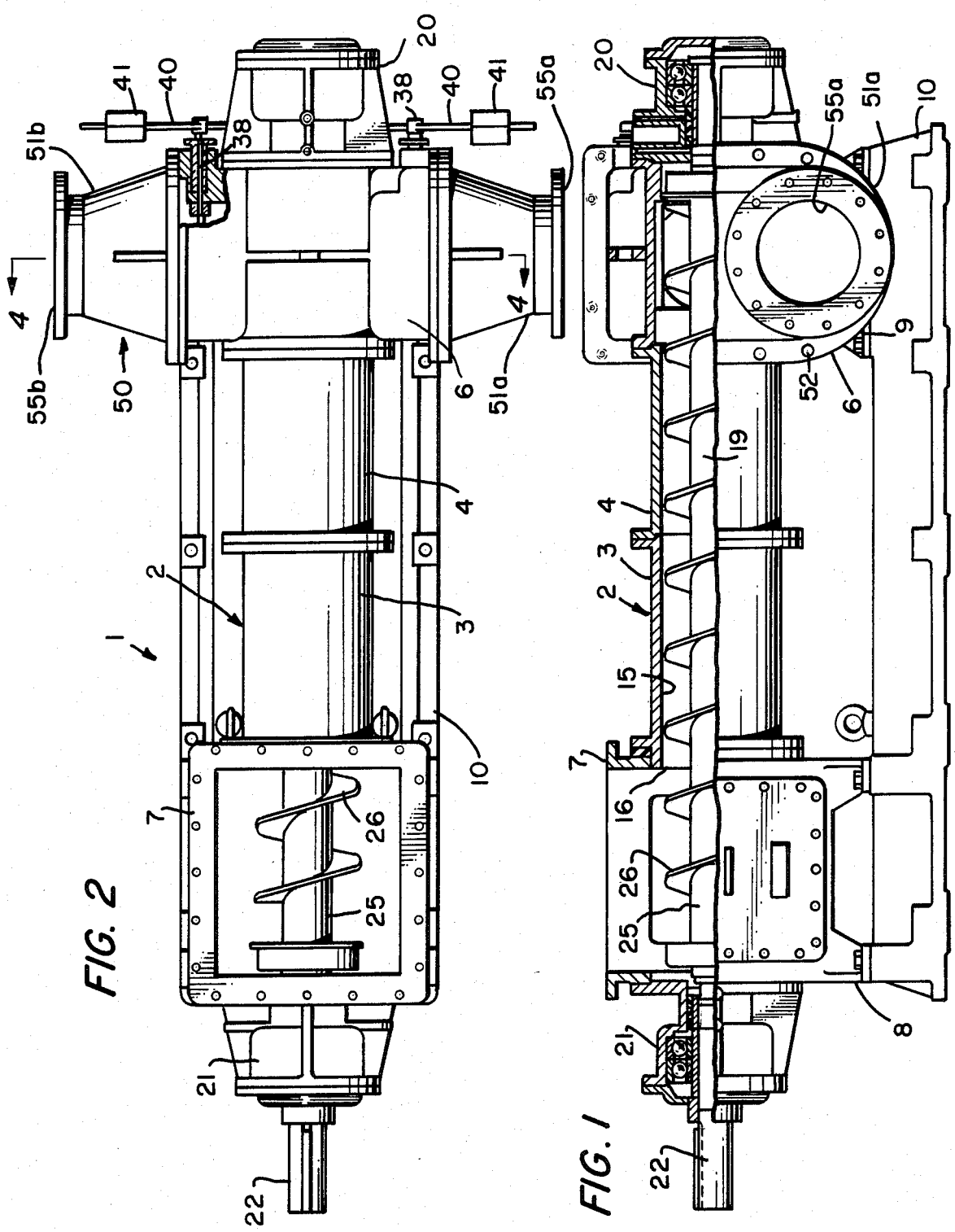

PNEUMATIC CONVEYING DEVICE

BACKGROUND OF THE INVENTION

This invention relates to pneumatic conveying devices in general and in particular to a line charging or pumping device for a pneumatic conveying system wherein solid particulate material to be conveyed is supplied from a source to a conduit where it is conveyed by gaseous fluid under pressure to a remote location. More particularly, the present invention relates to a pneumatic conveying device of the type which includes a screw impeller rotatably mounted in a casing for transporting materials from a source such as a hopper through the casing to a discharge chamber. Gaseous fluid under pressure is supplied to the discharge chamber for entraining material and conveying it from the discharge chamber through a conveying line. The device is particularly suited to conveying large quantities of abrasive materials such as cement raw meal or finished cement and pulverized coal over long distances.

Early designs of pneumatic conveying devices of the type to which the present invention relates were generally shown in U.S. Pat. No. 1,677,119. This design utilizes front and rear bearings to rotatably support a screw impeller within the bore of a casing. A compressing screw formed by either a reducing pitch screw or a reducing diameter casing bore or an increasing diameter screw impeller shaft or combination thereof serves to compact material within the bore to thereby form a seal of material in the casing between the material outlet and the material inlet of the casing. This seal of material serves to prevent "blowback" from the discharge chamber into the feed hopper of the device. This "blowback" takes the form of conveying gas under pressure short circuiting through the casing of the apparatus into the material hopper rather than serving to convey the material out of the discharge chamber and through the pneumatic conveying line.

A later design or a pneumatic conveying device of the type to which the present invention relates eliminated the front bearing. With this design, the screw impeller was supported only by rear bearings. The front of the screw is supported in part by material surrounding the screw. Material is discharged from the bore of the casing through an open end by the screw impeller into a discharge chamber. While a compressing screw of the type previously described was still utilized in this design, in order to aid in the formation of a material seal, a flap valve is positioned at the end of the casing for normally closing the end of the casing. This flap valve is openable by means of the material being conveyed through the casing exerting a force on the flap valve. During normal operation, the "blowback" previously described is prevented by the seal of material, but during times when conveying at less than capacity or when material supply through the casing to the discharge chamber is stopped, the flap valve closes to prevent blowback. This design is illustrated by U.S. Pat. No. 2,299,470.

A further development in pneumatic conveying devices of this type is shown in U.S. Pat. No. 4,109,966 and British Patent Specification No. 1,435,444. In that design, the use of both rear and front bearings as illustrated in U.S. Pat. No. 1,677,119 is combined with the use of a normally closed flap valve for aiding in the formation of a material seal as illustrated in U.S. Pat. No. 2,299,470.

It has been generally accepted by the prior art that it is necessary to include nozzles in the discharge chamber or windbox at or near the location of the outlet from the casing and inlet to the discharge chamber for the purpose of directing high velocity conveying gas into the discharge chamber. It was believed that localized high velocity gas was necessary to distribute the air flow over the entire discharge chamber and quickly fluidize the material being supplied to the discharge chamber. The air then expanded through the discharge chamber and served to entrain the material through the outlet of the discharge chamber and convey it through the conveying line.

Also with the prior art, it was believed in both the arrangement where the screw was supported at both ends such as in U.S. Pat. No. 1,677,119 and where the screw was supported at one end such as in U.S. Pat. No. 2,299,470 that only a single outlet from the casing was necessary or appropriate. With the present invention, it has been determined that more than one outlet from the casing can be utilized while supporting the screw impeller at both ends. The use of multiple outlets is believed to result in improved conveying capacities at reduced power consumption.

With the apparatus of the prior art, it is usually necessary to orient the pump or conveying apparatus in a specific position relative to the direction in which material is to be conveyed. With the early devices, it is necessary to orient the pump so that it is in line with the initial conveying direction, i.e. the axis of the pump screw must be parallel with the axis of the outlet of the conveying device and inlet of the conveying line. With the device shown in U.S. Pat. No. 4,109,966, the material pump or line charger has to be oriented in a direction perpendicular to the outlet of the discharge chamber and inlet of the conveying line. With the present device, the conveying line can be connected to either side or parallel to the pumping device and the inlet for compressed gas can be placed on the other side. Alternatively, the gas inlet and material outlet can be arranged parallel to the pumping device. This arrangement improves flexibility of system layout.

The use of multiple outlets from the casing of the apparatus and the elimination of nozzles between the conveying source and the conveying line results in improved capacity and a reduction in power requirements for the apparatus. The multiple outlets are believed to reduce power consumption required to rotate the screw impeller. The elimination of the nozzles in the discharge chamber serves to reduce pressure drop and thus reduce energy consumption of the means compressing the conveying gas. It is also believed that the multiple outlets result in less wear of the various components of the device.

SUMMARY

It is the principle object of this invention to provide a conveying device for solid particulate material which is capable of utilizing less power than prior devices while aiding in maintaining or increasing operating capacities.

It is a further object of this invention to provide a pneumatic conveying apparatus which is capable of having greater flexibility in system layout.

The foregoing and other objects will be carried out by providing an apparatus for conveying solid particulate material comprising a casing having an inlet for solid particulate material to be conveyed and multiple outlets for discharging solid particulate material; a screw impeller mounted in said casing for advancing solid particulate material from said inlet to said outlets; a pair of bearing means each operatively connected to one end of the casing rotatably mounting said screw impeller in said casing; a discharge chamber flow connected with the outlets of said casing having a pair of openings therein, one defining an inlet for gaseous fluid under pressure and the other defining an outlet for gaseous fluid and entrained solid material adapted to be connected to a conduit for conveying solid particulate material away from said discharge chamber whereby solid particulate material advanced from said inlet for solid particulate material is discharged from said casing through said outlets into said discharge chamber and gaseous fluid under pressure supplied to said discharge chamber entrains the solid particulate material and conveys the material through the conduit to which it is connected.

BRIEF DESCRIPTION OF THE DRAWINGS

The invention will be described in connection with the annexed drawings wherein:

FIG. 1 is an elevation view partially in section showing the pneumatic conveying apparatus of the present invention;

FIG. 2 is a top view of the conveying apparatus of the present invention;

DESCRIPTION OF THE PREFERRED ENVIRONMENT

Figure 4:
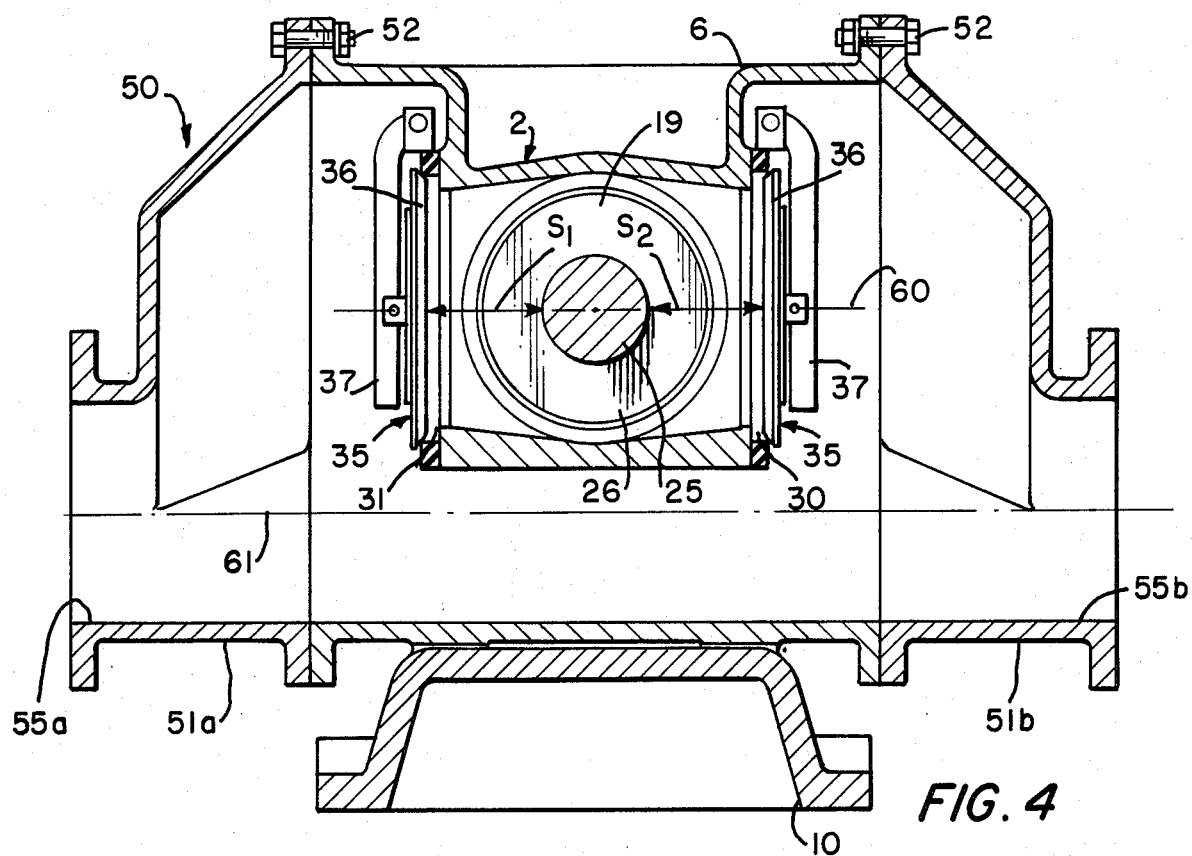
FIG. 4 is a sectional view taken on the line 4—4 of FIG. 2 showing the internal configuration of a portion of the present invention.
Figure 5:
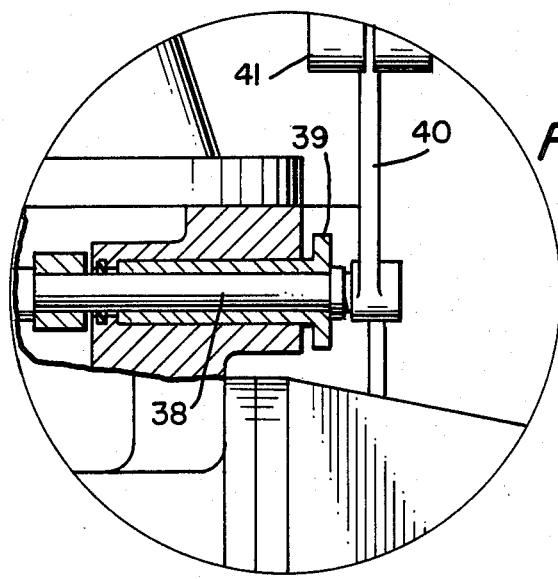
FIG. 5 is a sectional view on an enlarged scale of a portion of the present invention.
Figure 3:
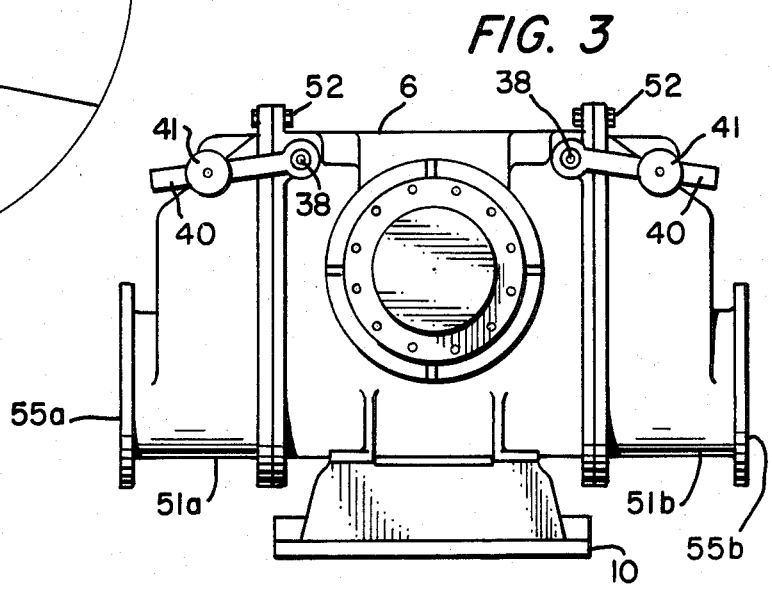
FIG. 3 is an end view of the apparatus of the present invention.

The pneumatic conveying device of the present invention takes the form of a line charging device or material pump for advancing solid particulate material from a source such as a hopper to a point where it can be introduced into a pneumatic conveying line where the material is conveyed at relatively high pressure.

Referring to the drawings, there is shown a pneumatic conveying apparatus or line charging device generally indicated at 1 which includes a casing 2 which may be formed of several coaxially aligned and joined together tubular members 3 and 4, a forward portion 6 and a rear portion 7. The rear portion 7 includes an integral pedestal 8 and the forward portion 6 includes an integral pedestal 9 for mounting the pump on a frame 10.

The rear portion 7 of casing 2 is suitably connected to a hopper or other source of solid particulate material to be conveyed. The forward portion 6 forms part of a discharge chamber 50 to be later described.

The casing 2 has a bore 15 therethrough. A screw impeller 19 is rotatably mounted within the bore 15 by means of a forward bearing 20 operatively connected to forward portion 6 and a rear bearing 21 operatively connected to rear portion 8. Each of the bearings 20 and 21 may be of the antifriction bearing type and are generally known in the art. The screw impeller 19 is adapted to be connected as at 22 to a suitable drive means (not shown). The screw impeller 19 includes a shaft 25 and screw flights 26 which extend through the open rear portion 7, through the casing members 3 and 4 and through the forward portion 6. The casing 2 includes an inlet 16 for material to be conveyed flow connected by means of rear portion 7 to a source (not shown) of solid particulate material to be conveyed. As shown in FIG. 4, the casing 2 also includes multiple outlets at the other end within forward portion 6. The multiple outlets are illustrated as a pair of diametrially opposed outlets 30 and 31.

The line charging device includes a pair of normally closed flap valves 35 each operatively associated with one of the outlets 30 and 31. Each of the flap valves 35 includes a disc or valve member 36 shaped similar to the openings 30 and 31 pivotally connected to a hinge plate 37 which is connected to a handle 40 by means of a shaft 38 mounted in a sleeve bearing 39. Gravitational force acting on a counterweight 41 exerts a downward force on handle 40 to pivot or bias the hingeplate 37 and valve member 36 towards the outlets 30 or 31 with which the relevant valve is associated to thereby define the normally closed valve.

The line charging device also includes a wind box or discharge chamber 50 flow connected to the outlet 30 and 31 of the casing 2. The discharge chamber 50 is defined by the forward member 6 and a pair of substantially identical generally conical shaped members 51a and 51b each mounted on opposite sides of the forward member 6 by means of bolts 52. Each of the sections 51a and 51b includes an opening therein with the opening in section 51a designated at 55a and the opening in section 51b designated at 55b. As will be explained, the openings 55a and 55b can serve as either an inlet for gaseous fluid under pressure or an outlet for gaseous fluid and entrained material.

In operation, the screw 19 is rotated by any suitable means such as an electric motor. Material to be conveyed enters the pump through rear section 7 and is advanced from section 7 into casing inlet 16, through the casing 2 towards forward section 6 and the outlets 30 and 31. When material is initially advanced through the casing toward the outlets 30 and 31, discharge from the casing 2 is prevented by the normally closed vlaves 35. Continued movement of material results in the build up of a seal of material in the casing in the areas $S_1$ and $S_2$ (FIG. 4) between impeller shaft 25 and outlet 31 and outlet 30, respectively. Further advancement of material results in adequate force being exerted on the valves 35 to overcome the gravitational force exerted by weight 41 to open the valves 35 by swinging the same away from the outlet 30 and 31 into the discharge chamber. The solid particulate material being conveyed is then discharged simultaneously through both the outlets 30 and 31 into the discharge chamber 50.

Gaseous fluid under pressure is supplied through one of the openings 55a or 55b from a source such as a compressor or blower, fluidizes the material in the discharge chamber and entrains and conveys the material through the other opening 55a or 55b and through a conduit, (not shown) which is normally connected to the outlet of the device. The seal of material which has built up in the areas $S_1$ and $S_2$ prevents the short circuiting or "blowback" of the gaseous fluid under pressure through the outlets 30 and 31, through bore 15 into the material inlet. When material flow through casing 2 stops either by lack of material or by screw 19 stopping, valves 35 will close by value member 37 closing its associated opening 30 or 31 to prevent blowback.

With the present invention, the material is discharged from both of the outlets 30 and 31 to thereby allow a freer movement of material through casing 2 to reduce consumption of power required to rotate the screw.

With the present invention, there are no nozzles interposed between the source of gaseous fluid under pressure and the discharge chamber outlet. The area between the gas inlet 55a or 55b and the gas and entrained material outlet 55a or 55b is substantially unobstructed. In the no load condition, i.e. when there is only gas and no material is being conveyed, the discharge chamber 50 is designed so that there is substantially no pressure drop across the discharge chamber i.e. between the two openings 55a and 55b. When material is being conveyed, there will be some pressure drop across the discharge chamber because work is being performed, but it is maintained at a minimum.

A further advantage with the present invention, is that the conveying line and the source of gaseous fluid under pressure can be connected to either conical member 51a or 51b. As shown in FIG. 4, the opening 55a can be connected to a source of gaseous fluid under pressure and serve as the inlet for gaseous fluid while at the same time the opening 55b serves as the outlet for gas and entrained material. In the alternative, if conveying system layout was such that it was desirable to have the conveying line extend to the left as shown in FIG. 4 rather than to the right, opening 55b can serve as the inlet for gaseous fluid under pressure while the opening 55a serves as the outlet for gas and entrained material. In addition, rather than having the openings 55a and 55b on the side of the conveying apparatus, perpendicular to the axis of the unit, the discharge chamber could be oriented so that the inlet for gaseous fluid under pressure and/or the outlet for gas and entrained material is parallel to the axis of the line charging device. It should be noted, however, that with such arrangement, the head room of the unit could increase.

The orientation of the various parts is significant. As shown in FIG. 4, the outlets 30 and 31 are diametrically opposed to each other. A line 60 passing through outlets 30 and 31 in the casing 2 is perpendicular to the axis of the screw impeller. In some instances, it may be advisable to have the casing outlets 30 and 31 at some angle other than horizontal as shown in FIG. 4 and at some position other than diametrically opposed, but the preferred embodiment is as shown. The openings 55a and 55b which define the inlet for gaseous fluid under pressure and the outlet for gas and entrained solids are aligned with each other and a line 61 passing through the center of the said inlet and said outlet is parallel to the line 60 passing through the center of the outlets in the casing. In alternate arrangements, the discharge chamber 50 might be rotated so that line 61 is at an angle to the line 60.

The use of diametrically opposed outlets 30 and 31 and the absence of nozzles or jets between the source of conveying air or gas under pressure contribute to permitting the use of the substantially identical and interchangeable inlet for gaseous fluid and outlet for gas and entrained solids. Because the discharge chamber 50 is substantially unobstructed, the conveying line can be connected to one side to either opening 55a or 55b and the source of gas under pressure is connected to the opposite side to the other opening 55a or 55b without making any modification to the equipment.

From the foregoing, it can be seen that the objects of the present invention have been carried out. An apparatus for conveying solid particulate material has been provided which will reduce operating horsepower. In addition, a device has been provided which allows for greater flexibility in conveying layout. The conveying line can operate either perpendicular to or parallel with the axis of the line charging device. The source of conveying gas can be placed on either side of the unit and the outlet for material can be placed on the other side of the unit. The elimination of the nozzles used in the prior devices serve to reduce the power consumption required by the source of gas under pressure.

It is intended that the foregoing be a description of a preferred embodiment and that the invention be solely limited by that which is within the scope of the appended claims.

We claim:

1. A line charging device for use in supplying pulverulent material to a conveying line comprising a barrel having a material inlet at one end for material to be conveyed and impeller means rotatably mounted in said barrel for transporting material from said material inlet through the barrel; said barrel having a pair of material outlets at the other end wherein said material outlets are diametrically opposed to each other; a discharge housing mounted on the said other end for receiving material from the material outlets; said discharge housing having a gas inlet on one side adapted to be connected to a source of gaseous fluid under pressure and a gas and entrained material outlet on the other side adapted to be connected to a pneumatic conveying line.

2. A line charging device according to claim 1 further comprising a pair of flap valves each operatively associated with one of the material outlets in the barrel for normally closing its associated material outlet.

3. A line charging device according to claim 2 wherein each of said flap valves is weighted so that said flap valve is normally closed and material within said barrel is compacted to form a seal of material for preventing gaseous fluid under pressure within said discharge chamber from passing through said material outlet through said barrel to said material inlet.

4. A line charging device according to claim 3 wherein said discharge chamber is substantially unobstructed between said gas inlet and said gas and entrained material outlet.

5. A line charging device according to claim 4 wherein said impeller means is rotatably mounted in bearings positioned at opposite ends of said barrel.

6. A line charging device according to claim 1 wherein both of said material outlets are parallel to the gas inlet and the gas and entrained material outlet of the discharge chamber.

7. Apparatus for conveying solid particulate material comprising:
a casing having an inlet for solid particulate material to be conveyed and a pair of outlets for discharging solid particulate material which are diametrically opposed to each other and a line passing through the center of the outlets in said casing is perpendicular to the axis of a screw impeller;
said screw impeller mounted in said casing for advancing solid particulate material from said inlet to said outlets; a pair of bearing means each operatively connected to one end of the casing for rotatably mounting said screw impeller in said casing;
a discharge chamber flow connected with the outlets of said casing having a pair of openings therein one defining an inlet for gaseous fluid under pressure and the other defining an outlet for gaseous fluid and entrained solid material adapted to be connected to a conduit for conveying solid particulate material away from said discharge chamber whereby solid particulate material advanced from said inlet for solid particulate material is discharged from said casing through said outlets into said discharge chamber and gaseous fluid under pressure supplied to said discharge chamber entrains the solid particulate material and conveys the material through the conduit to which it is connected.

8. Apparatus for conveying solid particulate material according to claim 7 further comprising a pair of flap valves, each operatively associated with one of the outlets in said casing for normally closing its associated outlet.

9. Apparatus for conveying solid particulate material according to claim 8 whrein each of said flap valves is positioned in said discharge chamber and is biased toward said outlet for normally closing its associated outlet and said valve is openable by means of pressure exerted by solid particulate material being advanced by said screw impeller and being swingable away from the outlet of said casing.

10. Apparatus for conveying solid particulate material according to claim 9 wherein the inlet for gaseous fluid under pressure in said discharge chamber and the outlet for gaseous fluid and entrained solid material are on opposite sides of said discharge chamber.

11. Apparatus to conveying solid particulate material according to claim 10 wherein a line passing through the center of said inlet for gaseous fluid and said outlet for gaseous fluid and entrained solids material is parallel to the line passing through the center of the outlets in said casing.

12. Apparatus for conveying solid particulate material according to claim 7 wherein said discharge chamber is substantially unobstructed beween said inlet for gaseous fluid under pressure and said outlet for gaseous fluid and entrained solids to thereby maintain a minimum gas pressure drop across said discharge chamber.

13. Apparatus for conveying solid particulate material according to claim 12 wherein said inlet for gaseous fluid is substantially identical and interchangeable with said outlet for gaseous fluid and entrained solids.

14. Apparatus for conveying solid particulate material according to claim 13 wherein the inlet for gaseous fluid under pressure in said discharge chamber and the outlet for gaseous fluid and entrained solid material are on opposite sides of said discharge chamber.

15. Apparatus for conveying solid particulate material according to claim 14 wherein a line passing through the center of said inlet for gaseous fluid and said outlet for gaseous fluid and entrained solids material is parallel to the line passing through the center of the outlets in said casing.

16. Apparatus for conveying solid particulate material according to claim 7 further comprising a pair of normally closed flap valves, each operatively associated with one of the outlets and openable by means of pressure exerted by solid particulate material being advanced through said casing by said screw impeller and said inlet for gaseous fluid is substantially identical with the outlet for gaseous fluid and entrained solids so that said conduit for conveying solid particulate material away from said discharge chamber may be selectively connected to either opening in said discharge chamber and a source of gaseous fluid under pressure may be selectively connected to the other opening in said discharge chamber.

17. Apparatus for conveying solid particulate material according to claim 16 wherein a gas flow path between the openings defining an inlet for gaseous fluid under pressure and the opening defining an outlet for gas and entrained solids is free of nozzles.

* * * * *